Nov. 23, 1965     I. I. LEWIN     3,218,750

FISHING LURE

Filed June 8, 1964     2 Sheets-Sheet 1

INVENTOR.
*IRVING I. LEWIN*

BY S.C. Yuter

ATTORNEY.

INVENTOR.
IRVING I. LEWIN

BY

ATTORNEY.

United States Patent Office 3,218,750
Patented Nov. 23, 1965

1

3,218,750
FISHING LURE
Irving I. Lewin, 32 Bryn Mawr Ave., Trenton, N.J.
Filed June 8, 1964, Ser. No. 375,416
10 Claims. (Cl. 43—42.28)

This application is a continuation-in-part of application Serial No. 214,710, filed August 3, 1962, and now abandoned.

This invention relates to fishing lures and toys, and particularly to a fishing lure or toy resembling a small fish in considerable detail and modified in accordance with certain physical principles to cause the tail of the fish lure or toy to wiggle or oscillate in such manner as to create the impression that the lure or toy is a live fish.

The primary object of this invention is to provide a fishing lure resembling a fish, and having the physical connection between the body of the fish and tail piece so formed that such body connection and the tail piece will constitute an elastic system in which the connection between the body and the tail piece is formed of minimum sectional thickness to provide an elastic region in which the elastic characteristic of the material being used will create a restoring force to operate upon the mass of the tail piece to establish the basic combination of a spring and mass of a vibrating system.

The fishing lure of the present invention is formed from a rubber-like material, for example one of the vinyl plastics, which may be readily formed in a mold to take on the physical contours and appearance of a small fish. In order that the fishing lure may be effective, it is desirable that it exhibit some characteristic movement that will create the impression that the lure is alive. Moreover, such movement should appear as the normal movement which such a fish might exhibit as it travels through the water.

The tail of a fishing lure is the logical place in which to establish movement. In order to establish a condition that is conducive to movement in the tail piece of a lure, this invention utilizes a basic condition in the phenomenon of vibrations, namely the combination of an elastic force-producing element and a mass attached thereto.

In the study of vibrations, a spring anchored at one end and connected to support a mass at the other end in suspension constitute a basic combination. When an external force is imposed on the mass, and the mass is then released, the energy stored in the spring by the force impressed on the mass, tends to restore the spring to its initial condition and thereupon moves the mass accordingly. As the spring tends to return to its initial condition, some energy is stored in the mass and that energy tends to swing the free end of the spring beyond its neutral original position, thereby transferring some of the energy from the mass into the spring. As that spring moves past its initial neutral position such newly transferred energy from the mass tends to move the spring back towards its neutral position, with the consequence that some of the energy is returned to the mass.

This transfer of energy back and forth between the mass and the spring continues until all of the energy is used up as heat, due to the internal friction of the system.

In accordance with the present invention, the tail piece of the fishing lure is provided with a depending piece of the material of which the lure is made attached to the lower fin of the tail and shaped as a forwardly-facing scoop to be pushed against by the water through which the lure is being pulled by a fishing line. Due to the thin section that connects the tail piece to the main body of the lure, the tail piece and the mass depending from it are relatively unstable and will easily oscillate about the connecting region of minimum thickness between the body

2 and the tail piece. Such oscillation of the tail piece is sufficient to generate an internal elastic force in the thin connecting section which tends to shift the tail piece over to the opposite side of a vertical medial plane through the body of the lure.

However, such movement back and forth of the tail piece as the moving mass of a vibrating system provides the desired wiggling movement of the tail of the fishing lure.

Thus, in accordance with the principle of this invention, the fishing lure is provided with a construction embodying essentially a spring and mass assembly in which the mass is constituted by the tail piece and an additional dependent element which creates a condition of instability in the tail piece, and which serves by its reaction on the water through which it is drawn, to impart further energy to the combination including the spring and mass represented by the thin connecting section between the body and the tail piece and mass of the dependent element.

Another feature of the fishing lure consists in the provision of a weight disposed at the lower front portion of the fishing lure body to cause the head of the fishing lure normally to project downwardly when the fishing line connected to the lure is slack.

One of the problems in connection with lures to which hooks are attached, is that the hooks are usually attached in free swiveling suspension and, as a result, the pointed barb of the hook may catch on the body of the lure and be thus rendered ineffective.

Another object of this invention is to provide a stiffener bar for the soft fish body, to serve as an attachment for a fishing line, and as a support for bait hooks, with such support shaped to prevent the hooks from catching on the fish lure body.

Because of the manner in which the tail of the lure oscillates actively from side to side as the lure is drawn through the water in which the lure is immersed, the lure has attractive motional activity which makes a toy attractive to children.

Another object of the invention therefore is to provide a child's toy, utilizing the body of the foregoing fishing lure and having the same construction features which cause the fish tail to oscillate and create the impression of an animated small fish, when pulled through a body of water.

These and other features of the invention are described in more detail in the following specification, taken in connection with the accompanying drawings, in which FIGURE 1 is a side elevational view of the fishing lure, with a portion broken away to expose a pellet of metal molded into and embedded in the front lower end of the fish body, and indicating the region of minimum thickness by the vertical dash line directly behind the back end of the dorsal fin in the region between the main body of the fish and the tail of the fish lure, and shows also the depending mass suspended from the lower fin of the tail;

Figure 1:
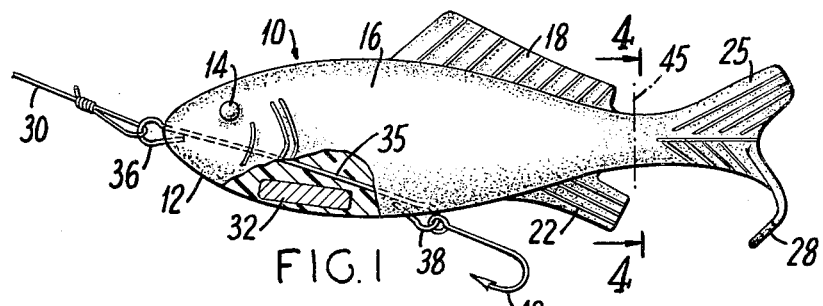
Figure 8:
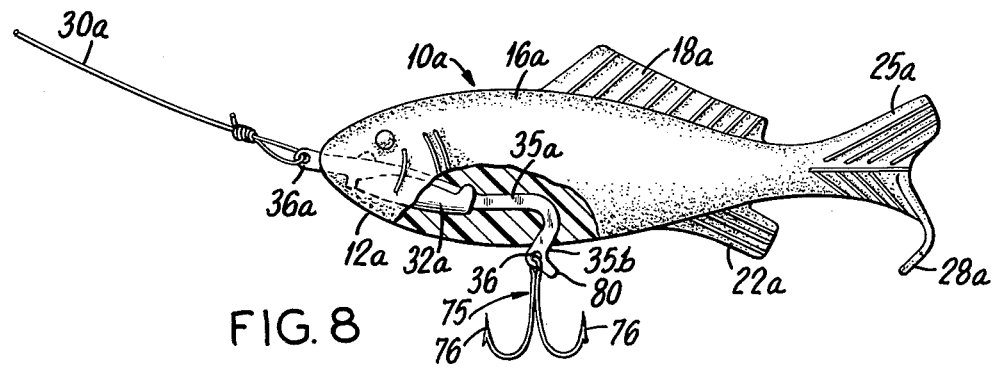
Figure 9:
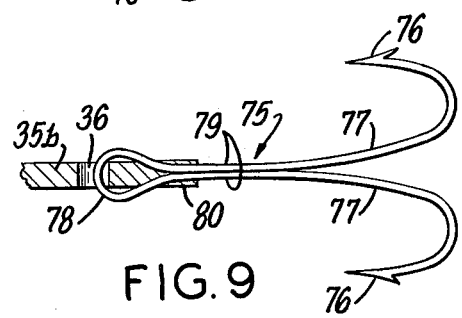
Figure 10:
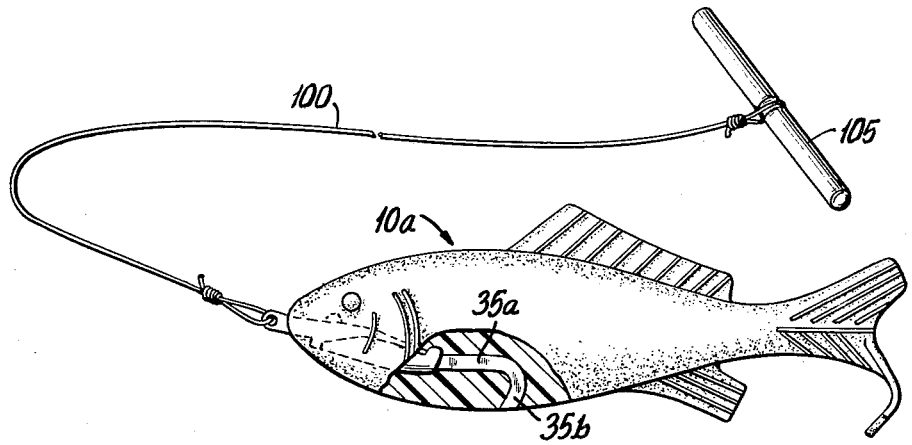

FIGURE 8 is a side elevational view, similar to FIGURE 1, showing the lure with a modified flat stiffener provided with a forward end opening for attachment of a fishing line, and provided with a rearward suspension opening for attachment of a double fish hook, and further provided with a stop element positioned near the hook suspension opening and serving to prevent movement of the hook to a region where the barb could engage and catch on the body of the lure;

FIGURE 9 is a plan view of a twin or double fish hook, showing how the two hook shanks are resiliently held pressed together just below the common eye to prevent motion of the double hook to a position where either hook barb could catch on the body of the lure, in response to the force of backward flow of water as the fish lure is pulled forward through the water; and FIGURE 10 is a side elevational view similar to FIGURE 8, but without the attachment for the fish hook, so the fish body may serve as a toy to be pulled through the water in a vessel, such as a bathtub, for example, by a short string and attached handle.

As shown in FIGURE 1 a fishing lure 10 constructed to embody the invention comprises a head 12 and eye 14 with a main body 16 having an upper or dorsal fin 18 and a lower or ventral fin 22 with a tail 25 having attached and dependent therefrom a mass 28 to be described in more detail below.

In order to cause the lure 10 to assume a downwardly inclined position in the water when the fishing line 30 connected to the lure is slack, a pellet 32 of metal, such as lead, is disposed in the lower front portion of the body of the lure 10 in front of the gravity center of the body material of the lure 10.

A stiffener or line and hook element 35 is also molded in the body of the lure 10, as shown, to provide a front loop 36 for attachment to the fishing line 30, and to provide a rear loop 38 to which one or more suitable fish hooks 42 may be attached.

The body material of the fishing lure 10 is preferably of a rubber like material, such as the vinyl plastics, which may be readily molded, at low temperature, and with relative ease, to various dimensions and thicknesses.

Figure 2:
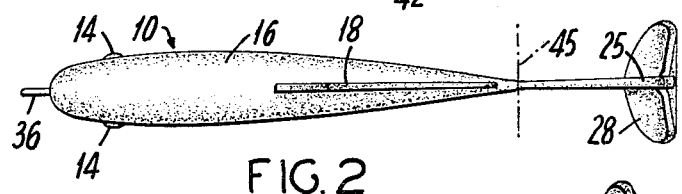
FIGURE 2 is a plan view of the lure in FIGURE 1, and locates the region of minimum thickness by the broken line and shows the depending mass attached to the tail.

As shown in FIGURE 2, the body of the lure 16 tapers backward to a region of minimum thickness at the broken line 45, shortly behind the rear end of the dorsal fin 18. Such region of minimum thickness at the line 45 is not strong enough to hold the tail piece 25 and the depending mass 28 in fixed position in longitudinal alignment with the main axis through the body of the lure 10. The region of minimum thickness 45 therefore bends easily under the force of the weight of the tail 25 and the mass 28. The resulting movement of such construction of thin section 45 and the weighted tail 25 may now be considered upon reference to FIGURE 2A.

Figure 2A:
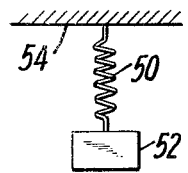
FIGURE 2A is a schematic representation of a vibrating system including a spring and a mass attached to the lower end of the spring whose upper end is shown secured to the stationary piece.

As shown in FIGURE 2A, a spring 50 supports a mass 52 from a fixed member 54. In accordance with the well-known theory that is fundamental in the study of mechanical vibrations, the mass 52 will assume a position below the spring 50 that will impose slight tension on the spring 50 depending upon its constant representing its strength, and depending upon the weight of the mass 52. If a force is then applied to the mass 52, and the mass then released, the added stress in the spring 50 will tend to restore the mass 52 to its previous position, but due to the inertia of the mass 52 that mass will move past its previous neutral position, and then in response to the force of gravity the mass will again move downward to restress the spring. Such continued movement of the mass up and down represents the oscillation or mechanical vibration of the system including the spring and the mass and will continue until the energy of the original disturbing force is used up.

In similar manner the elastic characteristic of the rubbery material of the fishing lure body as present at the region of minimum thickness, at 45, will act in a manner similar to the spring 50 of FIGURE 2A. The tail piece 25 of the lure 10 and the depending mass 28 will act in a manner corresponding to the mass 52 of the spring and mass assembly in FIGURE 2A.

The disposition of the dependent mass 28 at the bottom of the tail piece 25 is such that it will tend to bend the tail piece and mass assembly around a vertical axis passing through the minimum thickness region 45. Because of the flexibility of this rubbery material, the assembly of the tail piece and the mass 28 is relatively unstable and may easily fall to either side at random with respect to the medial plane vertically extending backward through the body of the lure.

Figure 3:
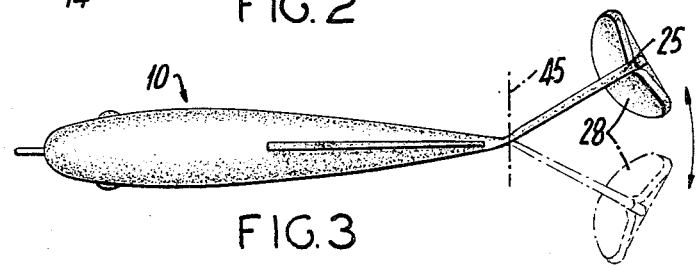
FIGURE 3 is a view similar to that in FIGURE 2 and shows the tail piece at two extreme positions of its oscillating movement.
Figure 4:
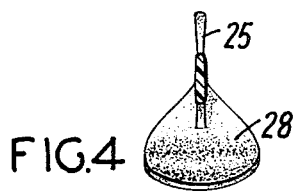
FIGURE 4 is a front elevational view of the dependent mass attached to the lower end of the tail piece.
Figure 5:
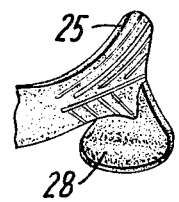
FIGURE 5 is a perspective view from a partial angle to show the concave nature of the front surface of the mass dependent from the tail piece.

Under such conditions, the tail piece and its dependent mass may swing from one extreme position to the other as indicated in the showing of FIGURE 3.

Such instability of the tail piece 25 and its dependent mass 28 about the minimum thickness zone 45 causes the oscillating movement of the tail piece and its dependent mass to become accentuated and substantial, as indicated in FIGURE 3.

As the lure is pulled through the water by the fishing line 30, the pressure of the water against the dependent mass 28 accentuates the instability of the tail piece and mass assembly, and causes positive vibration of the tail piece 25 with the consequent impression of life in the fishing lure 10.

The mass 28 is preferably formed as a scoop under the tail piece 25 in order to increase the effect of the water on the mass 28 to vibrate the tail 25 when the lure is pulled through the water by the fishing line 30.

The minimum thickness zone 45 need not be a section of reduced area or thickness, but will be the normal region of minimum thickness as the body tapers back naturally toward the tail. The emphasis on such region of minimum thickness has been in the interest of showing that the tail piece reacts with such region as the natural section about which bending will occur when the tail is moved, as by the depending mass or bib 28.

The major control in causing the tail to move to either side is achieved by that mass or bib 28. For example, as the lure is drawn forward through the water, the curved scoop formation of the bib will cause the bib to be raised somewhat, with its lower end more or less perpendicular to the body of the lure in forward movement. The upper fin 25 of the tail is thereby raised about a region as generally indicated at 45. In such raised position the tail and the bib are unstable. The bib action in response to the effect of the water is then to act as a motor to move the tail from side to side.

The raising adjustment of the bib is a function of the speed with which the lure is pulled through the water. In consequence, the resulting oscillation of the tail will vary with the speed of movement of the lure through the water. There is therefore an appropriate relationship between the size and curvature of the bib, and the softness of the body at the bend region 45 to enable the backward movement of the bib to cause some slight lift of the upper tail fin and to store some energy in the bend region 45.

The scoop or curved forward jutting bib 28 is purposely designed to be in a plane in quasi-perpendicular relation to the axis of the body when the lure is pulled through the water at any speed. Otherwise, since the bib is also made of soft material it would tend to move into a horizontal position, were the bib not molded in a position pointing forward or almost horizontal in its initial unstressed position.

Since the pressure of the water against the scoop-like mass 28 will act to tear the lower end of the scoop 28, it is desirable to provide for replacement of the tail piece and the mass 28 when a mass and tail piece are thus torn.

Figure 6:
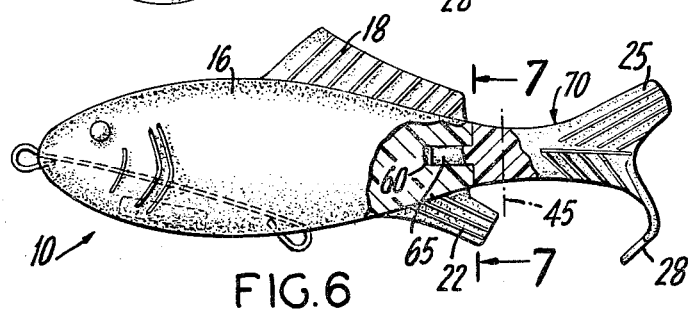
FIGURE 6 is a side elevational view of the lure similar to that in FIGURE 1 with a portion of the rear end of the body broken away to expose an opening for receiving a replacement tail piece when a tail piece is broken by the action of the water against the depending section.

For that purpose, as shown in FIGURE 6, a body 16 of the lure may be provided with a cylindrical receptacle 60 molded into the back end of the body substantially at the back end of the dorsal fin 18 and slightly in front of the region 45 of minimum thickness, in order to receive a plug 65 attached to the front end of a substitute tail piece 70 shaped to have a tail piece 25 and a dependent mass 28 similar to the original parts shown in FIGURE 1. In such construction the forward part of the lure may be made of a relatively harder material, and the original tail piece or substitute tail piece of the softer material.

Figure 7:
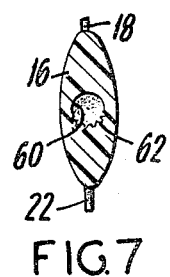
FIGURE 7 is a vertical sectional view taken along the line 7—7 of FIGURE 6 to show the cavity in the fish lure body for receiving a substitute or replacement tail piece.

FIGURE 7 shows one form of cylindrical receptacle 60 to be molded in the fish lure body as shown in FIGURE 6, with several radial grooves 62 for receiving similar radial ribs on the plug 65 to hold a substitute tail piece 70 against rotation, to prevent the action of the water against the dependent scoop mass 28 from twisting the tail piece out of proper normal position.

Thus, according to the invention, a fish lure is provided in which an oscilalting motion of the tail is induced by a construction utilizing the principles of mechanical vibrating systems, with a concave bib to provide the external disturbing forces.

In a second modification 10a of the lure, as shown in FIGURE 8, the parts are numbered, as far as possible, as in FIGURE 1, plus the post-script small letter a to indicate this second modification.

In that second modification 10a, in FIGURE 8, the stiffener line and hook element 35a is shown as a flat strip, having a hole 36a at its front end for attachment of the fishing line 30a, and having its back end shaped to embody a lateral arm 35b, having a hole 36 to receive a twin fishhook 75, and having a side extension or lug 80 to serve as a limit stop to prevent swinging movement of the fish-hook backward to an unndesired position where the fish hook barbs 76 could engage and catch on the body of the lure.

The operation of the lug 80 as a limit stop will be better understood upon reference to FIGURE 9, showing a side view of the lug 75 in relation to the lug 80.

The twin fish-hook 75 consists of two hook elements, each with a barb 76 and a supporting shank 77. The two barb-supporting shanks 77 are joined in a resilient eye-loop 78, whose resiliency presses the two shanks together at regions 79 where the hook shanks would engage the lug 80 when the hook 75 is swung backward. The lug 80 thus serves as a stop to prevent the fish-hook 75 from swinging back beyond a permited zone, and thus prevents the hook barbs from reaching and catching on the body of the lure.

In this modification 10a of the lure, the weight 32a is mounted on the body of the stiffener element 35a. The lateral arm 35b provides resistance to prevent the stiffener element 35a from sliding freely thrdough the lure body.

Because of the activity of the tail of the lure when the lure is pulled through water, the lure body without the fish hooks serves as a pleasing toy for children. As shown in FIG. 10, the lure body, for example 10a of FIGURE 8, may be provided with a short, towing string 100 and a short handle 105 by means of which a child may pull the lure body through a body of water and enjoy watching the tail activity as if the lure were a live fish.

The invention is not limited to the details shown, but may be variously modified within the spirit and scope of the invention as set forth in the claims.

What is claimed is:

1. A fishing lure comprising a body formed of soft rubber-like material to resemble an actual small fish of minnow size, including a body portion, dorsal and ventral fins and an oscillatable tail, with an independently resilient curved bib or deflector element of substantially scoop form defined by a substantially curved planar portion and depending solely from the lower end of the tail, said bib being curved concave forwardly with the lower portion pointing partial forwardly in its unstressed position, and said bib being freely flexible with respect to said tail in response to reaction pressure from water through which the lure is being drawn, with such flexing of the bib acting to slightly lift the tail to establish a stressed unstable position of the tail with consequent oscillation of the tail and bib wihout any corresponding movement of the body portion.

2. A fishing lure, as in claim 1, having a region of narrowing, between the body portion adjacent the end of the dorsal fin and the beginning of the tail, that defines a minimum section and therefore a region of easy articulation for the mass represented by the tail and the dependent bib or deflector.

3. A fishing lure, as in claim 1, in which said curved deflector element spans the medial plane passing vertically and longitudinally through the body of the lure.

4. A fishing lure for use in the water, comprising
   a molded body formed of soft rubber-like material and shaped in the form of a small fish of the size of a minnow, with a head, a body portion, dorsal and ventral fins and an oscillatable tail;
   a leader and hook wire assembly molded in place within the body and extending from the region of the mouth to the region adjacent the ventral fin;
   a weight molded into the body adjacent the head to cause the head to tilt downward when the lure is not being pulled through the water;
   and means constituting an elastic system with a portion of the body portion and the tail, said means consisting of a region of reduced cross-sectional area located between the body portion and the tail and just behind the dorsal fin, and of a mass of the same material as the body, said mass being attached to and depending from the lower end of the tail and thereby spaced from said region of reduced cross-sectional area, and said mass being shaped as a scoop and formed of independently resilient and freely flexible material suspended solely from the lower rear end of said tail and subject to flexing displacement by reaction force of water through which the lure is being pulled, whereby any such flexing movement of the mass tilts the tail and energizes the elastic system to establish vibration of the mass and the tail to create the appearance and impression of live motion by said tail of the lure, independent of motion of the body portion.

5. A fishing lure, comprising
   a body of soft rubber-like material shaped in the form of a small fish, with a head, a body portion, dorsal and ventral fins and an oscillatable tail, with the part of the body portion immediately behind the end of the dorsal fin and ahead of the tail formed to have reduced thickness and cross-sectional area taken transversely along the length of the body, to locate and define a vertical pivotal axial region with inherent elastance, about which the tail may freely swing and oscillate from side to side;
   and a mass of the same material as said body secured to the lower rear end of the tail, said mass embodying an independently resilient and freely flexible curved bib or deflector element of substantially scoop form defined by curved substantially planar portion extending to each side of the tail and depending from and connected solely to the lower rear end of said tail, and serving when moved through water to cooperate with the inherent elastance of said reduced area to establish a vibrating system to cause and to accentuate movement of the tail, without transmitting corresponding motional effect onto the body portion.

6. A fishing lure comprising
a body to resemble an actual small fish, and having a tail formed of soft resilient material attached to the body by a resilient portion of reduced cross-sectional area about which the tail may readily swing;
and a resilient curved bib or deflector element of substantially scoop form defined by a curved substantially planar portion extending to each side of the tail and depending from and connected solely to the lower end of said tail, said bib being curved concave forward with the lower portion pointing partially forward in its unstressed position and being adapted to be readily flexed with respect to said tail and tilted and moved backward by reaction pressure when drawn through water, with resultant slight lifting of the tail to thereby establish a stressed unstable position of the tail and the bib so the tail and bib will oscillate about said portion of reduced cross-section without causing any corresponding movement of the body.

7. A fishing lure comprising
a body in the shape and form of a fish relatively symmetrical about a vertical medial plane;
a tail supported at the rear end of the body and joined to the body at and by a region of reduced cross-section to permit articulate side-to-side motion of said tail relative to said body;
and means consisting of a resilient bib shaped like a scoop concave forward and depending from and connected solely to the lower end at the rear of said tail, and said resilient bib being readily flexed with respect to said tail in response to the reaction pressure of water through which the lure is being pulled, such flexing of said depending bib serving to flex and tilt the tail and to cause the tail to move independently of the body of the lure as the lure is moved through the water.

8. A fishing lure, as in claim 6, including
a stiffener extending at an angle through the forward portion of the body for attachment to a fishing line, and extending through the lower portion of the body for attachment of a hook.

9. A fishing lure, as in claim 8, in which
said stiffener embodies a stop element to prevent a fish hook from swinging back to engage and catch in the body of the lure.

10. A toy in the form of a small fish to be pulled through a bath of water and to exhibit active tail movement, comprising
a lure body constructed as in claim 1;
a stiffener anchored in the body thereof and embodying a tie element at the front end of said stiffener;
a string tied at one end to said tie element;
and a handle tied to the other end of said string.

References Cited by the Examiner
UNITED STATES PATENTS

| | | | |
|---|---|---|---|
| 1,955,408 | 4/1934 | Chapleau et al. | 43—42.44 X |
| 2,663,112 | 12/1953 | McMillin | 43—42.29 X |
| 2,690,026 | 9/1954 | King | 43—42.02 |
| 2,847,791 | 8/1958 | Simmons | 43—42.39 X |
| 3,070,917 | 1/1963 | Rowe | 43—42.24 |

FOREIGN PATENTS

| | | |
|---|---|---|
| 590,865 | 7/1947 | Great Britain. |

ABRAHAM G. STONE, *Primary Examiner.*